United States Patent [19]

Vriens

[11] Patent Number: 4,822,144
[45] Date of Patent: Apr. 18, 1989

[54] ELECTRO-OPTIC COLOR DISPLAY INCLUDING LUMINESCENT LAYER AND INTERFERENCE FILTER

[75] Inventor: Leendert Vriens, Eindhoven, Netherlands

[73] Assignee: U.S. Philips Corporation, New York, N.Y.

[21] Appl. No.: 134,432

[22] Filed: Dec. 17, 1987

[30] Foreign Application Priority Data

Dec. 24, 1986 [NL] Netherlands ............... 8603298

[51] Int. Cl.$^4$ .................................. G02F 1/13
[52] U.S. Cl. .................. 350/339 F; 350/345
[58] Field of Search .............. 350/339 F, 345; 340/701, 702; 313/509, 117

[56] References Cited

U.S. PATENT DOCUMENTS

| | | | |
|---|---|---|---|
| 4,634,926 | 1/1987 | Vriens et al. | 350/163 |
| 4,678,285 | 7/1987 | Ohta et al. | 350/339 F |
| 4,772,885 | 9/1988 | Uehasa et al. | 350/345 |

FOREIGN PATENT DOCUMENTS 2619368  11/1977  Fed. Rep. of Germany ...... 350/345

OTHER PUBLICATIONS

Spiller, Eberhard, "High Quality Fabry-Perot Mirrors for the Ultraviolet," Optik, vol. 39, (No. 2), Dec. 1973, pp. 118-125.

*Primary Examiner*—Stanley D. Miller
*Assistant Examiner*—Anita E. Pellman
*Attorney, Agent, or Firm*—John C. Fox

[57] ABSTRACT

In a color display device (LCD) (1) driven in the transmission mode and based on the combination of (LCD) switching elements and a phosphor pattern, the phosphor pattern being irradiated, for example by a UV source, the light output is considerably increased by arranging an interference filter between the radiation source and the phosphor layer.

10 Claims, 1 Drawing Sheet

ELECTRO-OPTIC COLOR DISPLAY INCLUDING LUMINESCENT LAYER AND INTERFERENCE FILTER

CROSS REFERENCE TO RELATED APPLICATION

Co-pending application Ser. No. 134,433, filed simultaneously with and assigned to the same assignee as this application, relates to a projection device having an electro-optic monochrome display device including a luminescent layer and interference filters.

BACKGROUND OF THE INVENTION

The invention relates to a display device comprising an electro-optical medium between two parallel transparent substrates having drive means to influence the transmission state of the electro-optical medium, one of the substrates having a pattern of at least two luminescent materials, said display device comprising a radiation source suitable for emitting sufficiently short-wave radiation to excite the luminescent materials.

The said display devices are used, for example in colour television or in colour monitors for the purpose of data display in computer systems, and in, for example display devices in dashboards etc.

A display device of the type mentioned in the opening paragraph is described in British Patent Specification No. 2,154,355. In the device shown in this specification a liquid crystal display device consisting of a liquid crystalline material between two glass plates is driven in the transmission mode. The device is exposed with UV radiation on one side, while the glass plate on the side of the UV source is coated with a pattern of phosphors. The areas associated with this pattern can be separately switched by means of switching electrodes.

The ultraviolet radiation emitted by the UV source produces conversion in the luminescent layers into a colour in the visible part of the spectrum (for example, into the primary colours red, green and blue) so that visible light passes to the other side of the device in dependence on the state of the electro-optical medium to form a (colour) picture.

However, in this conversion a large part of the quantity of light generated in the phosphors is lost. In fact, the conversion is effected within a very thin layer (approximately 2 to 3 microns) on the side of the incident ultraviolet radiation. Since the generated visible light is emitted in all directions and is also dispersed by the phosphors, a large part thereof (approximately 60 to 70%) leaves the phosphor layer on the side of the UV source. This leads of course to a lower brightness, but moreover a part of the light generated in the phosphors may be dispersed back via reflection from various surfaces (for example a glass-air surface when the luminescent material between the UV source and the electro-optical medium is provided on a glass substrate), and then at an unacceptably large spatial angle or in undesired areas. All this leads to a loss of resolution and a decresed contrast.

It is an object of the invention to provide a display device in which the said drawbacks are at least substantially obviated. It is based on the recognition that notably the said loss of light due to emission and dispersion in the direction of the radiation source can be substantially prevented.

SUMMARY OF THE INVENTION

To this end a color display device according to the invention is characterized in that an interference filter is arranged between the radiation source and the luminescent materials, which filter substantially completely passes the short-wave radiation and substantially completely reflects radiation generated in the luminescent materials.

By using such an interference filter the radiation required for excitation, for example a characteristic wavelength of 254 nm (Hg resonance line) or a wavelength range of 360–380 nm is passed either for all angles of incidence or for a selected angle range. Furthermore the presence of the filter causes light which is generated in the phosphor layer and is emitted in the direction of the radiation source to be substantially completely reflected by the filter for all angles of incidence. A light output gain which may be a factor of 2 to 3 is then obtained with respect to a device without an interference filter.

An additional advantage is that there are substantially no reflections against surfaces located closer to the radiation source because substantially all radiation in the direction of the source is reflected by the interference filter. Consequently, resolution and contrast are improved considerably.

It is true that due to the reflections on the intereference filter and in the phosphor layer a small spatial broadening of a picture element (approximately 10–20 $\mu$m) occurs, but it is small with respect to the dimensions which are conventional for picture elements. In addition a possible spatial separation between picture elements, which may be experienced as being troublesome, is partly suppressed in this way.

A first embodiment of a display device according to the invention is characterized in that the interference filter and the luminescent materials are arranged between the radiation source and the electro-optical medium, while the electro-optical medium comprises a light switch for the radiation generated in the luminescent materials.

The phosphors preferably emit visible light, for example the three primary colours red, green and blue, while the electro-optical medium will generally be a liquid crystalline medium, although electroscopic displays may be used alternatively.

A second embodiment is characterized in that the interference filter is arranged between the electro-optical medium and the luminescent materials on the side of the electro-optical medium remote from the radiation source, while the electro-optical medium comprises a switch for the radiation exciting the luminescent materials.

There are also various possibilities for the nature of the interference filter used. For example, a so-called all-dielectric multi-layer filter comprising at least 20 but preferably 30 to 40 layers alternately having a high and a low refractive index may be chosen. An advantage thereof is that no absorption occurs in the filter, provided that the materials chosen are transparent both to the exciting and the generated radiation. The selected number of layers (at least 20) also ensures a very broad reflection band for the entire visible spectrum. On the other hand an advantageous choice is a metal-dielectric filter comprising only 3 to 5 layers of alternately a metal layer and a layer of dielectric material.

Various choices are also possible for the phosphors. When using a radiation source based on the 254 nm Hg resonance line the following combination is very satisfactory:

$BaMg_2Al_{16}O_{27}$:Eu as a blue phosphor (maximum emission at 450 nm);

$CeMgAl_{11}O_{19}$:Tb as a green phosphor (maximum emission at 545 nm);

$Y_2O_3$:Eu as a red phosphor (maximum emission at 612 nm).

The associated emission wavelengths are satisfactorily suitable for the maximum sensitivity of each of the three colour receptors of the eye; this renders an eminent colour rendition possible. When using a radiation source mainly with long-wave UV radiation (for example a high-pressure mercury lamp), for example ZnS:Ag (blue), (Zn,Cd)S:Cu,Al (green) and $Y_2O_2S$:Eu (red) are very suitable.

BRIEF DESCRIPTION OF THE DRAWINGS

The invention will now be described in greater detail and by way of example with reference to the accompanying drawings in which.

DESCRIPTION OF THE PREFERRED EMBODIMENTS

Figure 1:
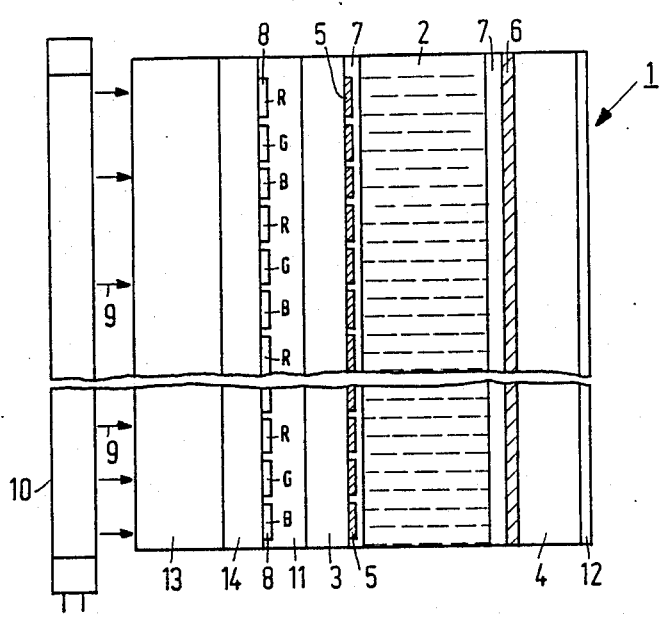
FIG. 1 is a diagrammatic cross-section of a first embodiment of a display device according to the invention.

FIG. 1 shows diagrammatically a liquid crystal display device having a liquid crystal 2 as an electro-optical medium present between two parallel transparent substrates 3, 4 of, for example, glass. Transparent strip-shaped electrodes 5, 6, of, for example tin oxide, are provided on these substrates, defining a matrix of switching elements. The electrodes are coated in this embodiment with a layer of orienting material 7 of, for example silicon oxide.

Furthermore the device comprises a pattern 8 of luminescent materials which are provided in accordance with a given arrangement and which radiate in this embodiment red, green and blue light if they are irradiated by, for example UV light 9 from a radiation source 10. The red, green and blue phosphor dots coincide with the switching points defined by the electrodes 5 and 6, while the liquid crystal 2 serves as a light switch for the light generated in the phosphors. The device also comprises a polariser 11 and an analyser 12 for visible radiation, as well as a substrate 13 of a material which is transparent to UV radiation such as, for example quartz.

According to the invention an interference filter 14 which substantially completely passes the UV light 9 and substantially completely reflects light generated in the phosphors is arranged between the radiation source 10 and the phosphor pattern 8. Thereby, light generated in the phosphor layer 8 which would otherwise leave the phosphor layer 8 on the side of the filter 14 is reflected by this filter 14 and thus contributes to the total light output. In this way a greater brightness (2 to 3 times) is obtained than if the interference filter 14 were not provided.

Since this filter substantially completely reflects the light generated in the phosphor layer 8, unwanted reflections on surfaces located between the phosphor layer 8 and the radiation source 10 are avoided so that the resolution and the contrast of such a display device are considerably improved.

It is true that due to reflections of the red, green and blue radiation from the interference filter 14 a spatial broadening of an excited point of the matrix occurs in the phosphor layer 8, but this is usually negligible (10 to 20 $\mu$m). In addition this spatial broadening may sometimes have a positive effect because spatially fully separated colour regions are perceived by the eye as substantially tangent (or even overlapping each other to a slight extent), which most observers experience as a pleasant phenomenon.

Various types of materials may be chosen for the liquid crystalline material 8. For example, the so-called twisted nematic materials may be used, but materials whose operation is based on birefringence may also be used such as are described, for example in EP No. 0,131,216 (270° twist) or in DE No. 34,31,871 (180° twist) or ferro-electric liquid crystals.

On the other hand the invention may also be used for other electro-optical display devices which are driven in the transmission mode such as, for example (dry) electroscopic displays.

Figure 2:
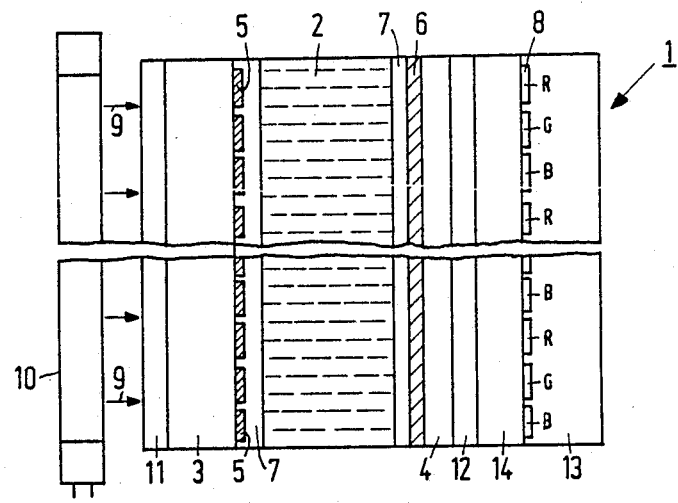
FIG. 2 is a diagrammatic cross-section of a second embodiment of a display device according to the invention.

FIG. 2 shows a further embodiment of a device according to the invention. The liquid crystal material 2 functions as an UV radiation switch and the phosphor pattern 8 is present on the viewing side of the device. The liquid crystal material and UV wavelength used can be optimized in such a way that a maximum contrast is achieved. In the relevant embodiment the liquid ROTN 3010 from Hoffmann-Laroche is chosen for the liquid crystal material and the wavelength of the exciting radiation 9 is approximately 370 nm. The cell structure is such that a twist of the director of approximately 270° occurs (SBE cell) between the surfaces of the two orientation layers 7. The remaining reference numerals of FIG. 2 denote the same components as those in FIG. 1. It is to be noted that the polariser 11 and the analyser 12 are not suitable for UV radiation, and the substrates 3 and 4 are transparent to UV light. If desired, an extra glass plate (transparent to UV light) may be arranged between the analyser 12 and the interference filter 14. The analyser 12 and the filter 14 may also change places.

Figure 3:
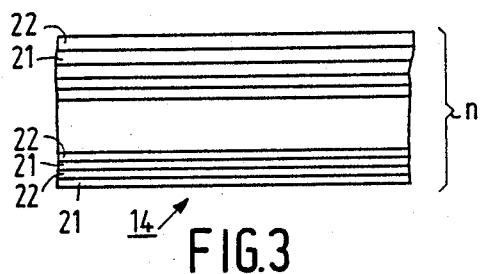
FIG. 3 is a diagrammatic cross-section of an interference filter for use in such display devices.

There are various possibilities for the structure of the interference filter 14. For example, use can be made of a so-called "all-dielectric" multilayer filter comprising a minimum number of 20 layers alternately having a high and a low refractive index. FIG. 3 shows such a filter 14 comprising 30 to 40 layers 21, 22, the layers 21 consisting of a material having a low refractive index and the layers 22 consisting of a material having a high refractive index. For example, magnesium fluoride ($MgF_2$) or silicon oxide ($SiO_2$) may be chosen for the layers 21, either of which materials is suitable for all wavelengths of the radiation source 10. Materials which may be chosen for the layers 22 are, for example: hafnium oxide ($HfO_2$) which is suitable for all wavelengths; zirconium oxide ($ZrO_2$), suitable for $\lambda > 350$ nm; or one of the materials titanium oxide ($TiO_2$), tantalum oxide ($Ta_2O_5$) or niobium oxide ($Nb_2O_5$), which are suitable for $\lambda > 370$ nm.

Alternatively, the filter may be in the form of a "metal-dielectric" filter (see FIG. 4) of 3-5 layers, in this embodiment 5 layers, alternately having a metal layer 23 and a dielectric layer 24.

Figure 4:
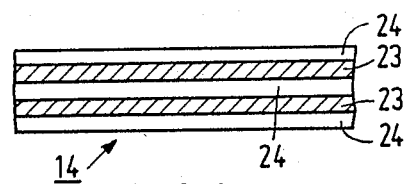
FIG. 4 is a diagrammatic cross-section of a second interference filter for use in such display devices.

Both filters may be manufactured by means of electron-beam vapour-deposition techniques, while the filter of FIG. 4 may alternatively be obtained by means of sputtering.

In the embodiment of FIG. 1, the radiation source 10 is a UV source which directly emits the 254 nm Hg resonance line (for example, a low pressure mercury lamp with a quartz envelope). Although at this wavelength quartz must also be chosen for the substrates 3 and 13, phosphors for the display of blue, green and red which are very efficient at this wavelength are known, such as:

$BaMg_2Al_{16}O_{27}$:Eu as a blue phosphor, $\lambda_{max}=450$ nm;

$CeMgAl_{11}O_{19}$:Tb as a green phosphor, $\lambda_{max}=545$ nm;

$Y_2O_3$:Eu as a red phosphor, $\lambda_{max}=612$ nm.

In this embodiment a long-wave UV source such as a high pressure mercury lamp may alternatively be chosen as a radiation source.

For the embodiment of FIG. 2, a radiation source is chosen which emits radiation in the wavelength range of 350-380 nm, for example a high-pressure mercury lamp. In this case normal glass instead of quartz glass can be chosen for the embodiment of FIG. 1, and ZnS:Ag (blue phosphor), (Zn,Cd)S:Cu,Al (green phosphor) and $Y_2O_2S$:Eu (red phosphor) are suitable as phosphors.

The phosphor layer and the interference filter in this embodiment may be entirely provided on the outside (viewing side). To prevent parallax, the UV light 9 must then be substantially parallel.

As already stated, a wide choice is also possible with respect to the electro-optical element (various types of LCD, such as TN-LCD, SBE, HBE, FELCD, electroscopic displays, etc.).

Finally a pattern-shaped second interference filter registering with the phosphor dots may be arranged on the other side (viewing side) of the phosphor layer, which filter only passes light at a small spatial angle and in which extra brightness is obtained at a small angle because the reflection greatly increases for light rays extending at an angle of more than 20° to 35° to the normal on the filter. Such brightness-enhancing interference filters have been described for monochrome display devices in commonly assigned co-pending application Ser. No. 134,433, filed simultaneously herewith.

Such a filter offers an additional advantage in that the previously mentioned spatial broadening is compensated, which may be useful in data display devices (data graphic displays).

The invention is of course not limited to the embodiments referred to. Several variations within the scope of the invention are possible and will become apparent to those skilled in the art.

What is claimed is:

1. A color display device comprising: an electro-optical medium; two parallel transparent substrates flanking the medium and having drive means to influence the transmission state of the medium; a pattern of at least two luminescent materials on one of the substrates; and a radiation source suitable for emitting sufficiently short-wave radiation to excite the luminescent materials, characterized in that an interference filter is arranged between the radiation source and the luminescent materials, which filter is substantially coplanar and coextensive with the radiation source and the luminescent materials, and substantially completely passes the short-wave radiation and substantially completely reflects radiation generated in the luminescent materials.

2. A display device as claimed in claim 1, characterized in that the interference filter and the luminescent materials are arranged between the radiation source and the electro-optical medium, and the electro-optical medium comprises a light switch for the radiation generated in the luminescent materials.

3. A display device as claimed in claim 1, characterized in that the interference filter is arranged between the electro-optical medium and the luminescent materials on the side of the electro-optical medium remote from the radiation source, and the electro-optical medium comprises a switch for the radiation exciting the luminescent materials.

4. A display device as claimed in claim 1, characterized in that the electro-optical medium comprises a liquid crystalline material.

5. A display device as claimed in claim 1, characterized in that the interference filter is a dielectric filter comprising at least 20 layers alternately having a high and a low refractive index, said layers substantially completely passing the exciting radiation and substantially completely reflecting the radiation generated in the luminescent materials.

6. A display device as claimed in claim 5, characterized in that the layers having a high refractive index comprise one or more of the materials hafnium oxide ($HfO_2$), zirconium oxide ($ZrO_2$), titanium oxide ($TiO_2$), tantalum oxide ($TaO_5$) or niobium oxide ($Nb_2O_5$), and the layers having a low refractive index comprise one or more of the materials magnesium fluoride ($MgF_2$) or silicon oxide ($SiO_2$).

7. A display device as claimed in claim 1, characterized in that the interference filter comprises 3-5 layers of alternately a metal layer and a layer of dielectric material.

8. A display device as claimed in claim 1, characterized in that the radiation source emits radiation at a central wavelength of 254 nm and in that one or more of the following materials are chosen for the luminescent material:

$BaMg_2Al_{16}O_{27}$:Eu as a blue phosphor;
$CeMgAl_{11}O_{19}$:Tb as a green phosphor;
$Y_2O_3$:Eu as a red phosphor.

9. A display device as claimed in claim 1, characterized in that the radiation source emits radiation at a wavelength in the range of 360-380 nm.

10. A display device as claimed in claim 1, characterized in that a pattern-shaped second interference filter is arranged on the other side of the pattern of luminescent material, whereby the reflection greatly increases for light rays which extend at an angle of more than 20° to 35° to the normal on the filter.

* * * * *